June 2, 1925.  1,540,434

A. C. STONE

CAMP STOVE

Filed March 12, 1924

INVENTOR.
Arthur C. Stone

BY *Davis + Simms*

HIS ATTORNEYS.

Patented June 2, 1925.

1,540,434

UNITED STATES PATENT OFFICE.

ARTHUR C. STONE, OF ROCHESTER, NEW YORK.

CAMP STOVE.

Application filed March 12, 1924. Serial No. 698,759.

*To all whom it may concern:*

Be it known that I, ARTHUR C. STONE, a citizen of the United States, and resident of Rochester, in the county of Monroe and State of New York, have invented certain new and useful Improvements in Camp Stoves, of which the following is a specification.

The present invention relates to camp stoves and an object thereof is to provide a construction which, when not in use, may be compactly folded into small compass, and which, when in use, will so hold the fire that the starting of forest fires or the like therefrom will be prevented. Another object of the invention is to provide a construction in which the fire pan is adjustable with reference to the cooking grate by a means which is simple in operation and in construction. Still another object of the invention is to provide a receptacle adapted to hold the cooking grate when not in use and to act also as a fire pan.

To these and other ends, the invention consists of certain parts and combinations of parts, all of which will be hereinafter described: the novel features being pointed out in the appended claims.

Figure 1:
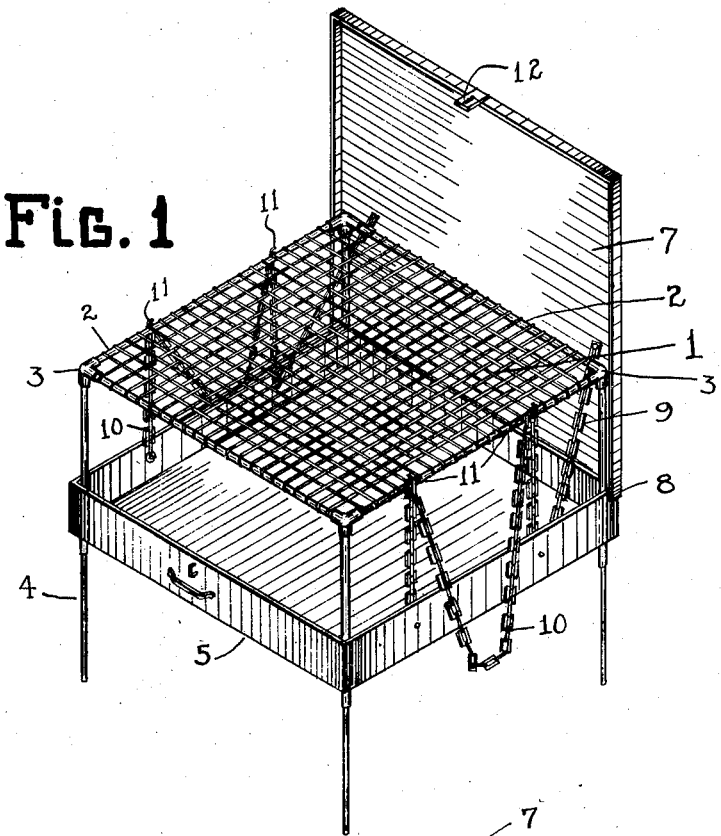
Fig. 1 is a perspective view of the stove in condition for use.
Figure 3:
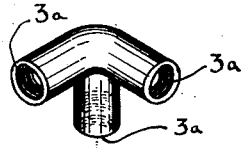
Fig. 3 is a detail view of the connection between the legs and the cooking grate.
Figure 2:
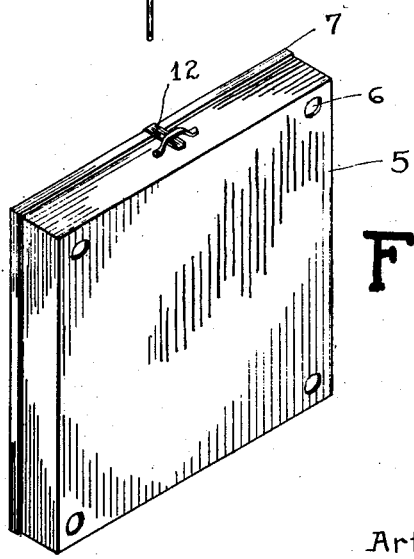
Fig. 2 is a perspective of the stove folded.

Referring more particularly to the embodiment of the invention herein illustrated, 1 indicates a cooking grate formed of open mesh wire fabric and secured, in this instance, at its edges to a rectangular frame 2 formed by side pieces of pipe and corner pieces in the form of three way elbows indicated at 3. One of the arms or ways 3ᵃ of each elbow depends on the under side of the frame and forms a socket in which the legs 4 may detachably interlock to support the cooking grate in an elevated position.

The fire pan 5 is preferably in the form of a sheet metal receptacle of slightly larger area than the area of the cooking grate so that the grate may be received in the receptacle. This receptacle has openings 6 in its bottom through which the legs 4 may be extended. The receptacle also has a closure 7 hinged thereto at 8 and adapted to inclose the cooking grate 1 in the receptacle. This cover when the pan or receptacle 5 is suspended below the cooking grate 1, is held against inward swinging movement by cooperation with a side edge of the cooking grate. Outward swinging of the cover is limited by a flexible chain or connection 9. In this way the cover will act as a wind shield for the fire for any adjustment of the fire pan 5 with reference to the cooking grate 1.

In order to support the fire pan 5 in different positions with reference to the grate 1, the fire pan may be provided on opposite sides with two chains 10 which may be in one piece with the chains 9. These chains 10 are adapted to be hooked over hooks 11 on the grate when the stove is in condition for use. These chains are thrown over the top of the grate, after the latter has been fitted in the receptacle or fire basket 5. It is apparent that the fire pan may be held in different positions with reference to the cooking grate and in any position the cover of the fire pan will act as a wind shield for the fire. The fire is held within the fire pan and will not drop on the ground and thus start forest fires or the like. In collapsing the stove, the fire receptacle 5 is elevated until the cooking grate 1 enters the same after which the cover is closed and fastened in closed position by a hasp 12 or other suitable means. The legs may then be removed. It will be noted that the adjustment between the pan and the cooking grate or grill permits the fire to be raised or lowered so that the heat may be increased or decreased to such an extent that the cooking is discontinued, while the food is maintained in a warm condition.

What I claim as my invention and desire to secure by Letters Patent is:

1. The combination with a cooking grate having legs depending therefrom, a receptacle for enclosing said grate having openings in its bottom through which said legs extend, and means for suspending said receptacle from the cooking grate so that the receptacle may act as a fire pan for the grate.

2. The combination with a cooking grate having legs depending therefrom, a receptacle for enclosing said grate having openings in its bottom through which said legs extend, means for suspending said receptacle from the cooking grate so that the receptacle may act as a fire pan for the grate, and a hinged closure for the receptacle arranged when in an open position to act as a wind shield for the fire in the fire port.

3. In a camp stove, the combination with a frame comprising side pieces, three way elbows connecting said side pieces, and a cooking grate supported by said side pieces, of legs detachably connected with the three way elbows, and a fire pan having openings through which the legs extend.

4. In a camp stove, the combination with a frame comprising side pieces, three way elbows connecting said side pieces, a cooking grate supported by said side pieces, of legs detachably connected with the three way elbows, a fire pan having openings through which the legs extend, and means for adjustably suspending said fire pan from the frame.

5. In a camp stove, the combination with a cooking grate and legs connected with said grate, of a fire pan having openings through which said legs extend, and means for adjustably supporting said fire pan from the cooking grate.

6. In a camp stove, the combination with a cooking grate and legs connected with said grate, of a fire pan having openings through which said legs extend, means for adjustably supporting said fire pan from the cooking grate, and a wind shield supported by said fire pan and extending upwardly therefrom to close the space between the pan and the grate.

7. The combination with a cooking grate and legs supporting the same, of a fire pan and means for suspending said fire pan comprising hooks on the cooking grate, and two chains each secured at opposite ends to one side of the fire pan and adapted to be engaged by said hooks, intermediate portions of the chains serving as a means by which the fire pan may be adjusted.

ARTHUR C. STONE.